(12) United States Patent
Osogami et al.

(10) Patent No.: US 11,106,738 B2
(45) Date of Patent: Aug. 31, 2021

(54) REAL-TIME TREE SEARCH WITH PESSIMISTIC SURVIVABILITY TREES

(71) Applicant: INTERNATIONAL BUSINESS MACHINES CORPORATION, Armonk, NY (US)

(72) Inventors: Takayuki Osogami, Kanagawa-ken (JP); Toshihiro Takahashi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

(21) Appl. No.: 16/419,214

(22) Filed: May 22, 2019

(65) Prior Publication Data

US 2020/0372080 A1  Nov. 26, 2020

(51) Int. Cl.
*G06F 7/00* (2006.01)
*G06F 16/903* (2019.01)
*G06N 20/00* (2019.01)
*G06F 16/901* (2019.01)

(52) U.S. Cl.
CPC .... *G06F 16/90335* (2019.01); *G06F 16/9027* (2019.01); *G06N 20/00* (2019.01)

(58) Field of Classification Search
CPC .......... G06F 16/90335; G06F 16/9027; G06N 20/00
USPC .................................................. 707/600–899
See application file for complete search history.

(56) References Cited

U.S. PATENT DOCUMENTS

| 9,679,258 B2 | 6/2017 | Mnih et al. |
| 9,914,452 B1 | 3/2018 | Ferguson et al. |
| 2012/0203420 A1* | 8/2012 | Kim .................. G05D 1/08 701/25 |
| 2017/0061283 A1 | 3/2017 | Rasmussen et al. |

FOREIGN PATENT DOCUMENTS

GB           2564897 A      1/2019

* cited by examiner

*Primary Examiner* — Isaac M Woo
(74) *Attorney, Agent, or Firm* — Tutunjian & Bitetto, P.C.; Joseph Petrokaitis

(57) ABSTRACT

A method is provided for evaluating a next action of a target object in an environment. The method includes simulating, by a processor device for each of possible actions of the target object in the environment, a next state occurring thereafter to obtain a plurality of simulated next states, based on a pessimistic scenario in which all possible unfavorable actions of other objects occur in the next state in simulation. At least two of the possible unfavorable actions in the next state are unable to simultaneously occur in reality. The method further includes identifying, by the processor device, a safety area for the target object in each of the plurality of simulated next states. The method also includes evaluating, by the processor device, each of the possible actions of the target object, based on the safety area for the target object in each of the plurality of simulated next states.

20 Claims, 19 Drawing Sheets

⋈ x5
5 x3
4 x3     =   safety score
3 x3

REAL-TIME TREE SEARCH WITH PESSIMISTIC SURVIVABILITY TREES

BACKGROUND

The present invention generally relates to query systems, and more particularly to a real-time search with pessimistic survivability trees.

In many of the applications where we control robots, cars, and other agents with Artificial Intelligence (AI), those AI agents often need to make critical decisions in real time, where they need to take into account how the environment and the behavior of the other agents change as we take actions. Reinforcement learning is a technique to learn a policy or a value function from experience, where the policy or the value function allows us to map (a history of) observations to an action in a way that a cumulative reward is maximized. However, when the model of the environment is available, Monte Carlo Tree Search, possibly combined with reinforcement learning, is a very effective method. Unfortunately, Monte Carlo Tree Search requires large computational resources when actions are chosen and has limited applicability to applications that requires decision making in real time. Hence, there is a need for an improved real-time, tree-based search.

SUMMARY

According to an aspect of the present invention, a computer-implemented method is provided for evaluating a next action of a target object in an environment. The method includes simulating, by a processor device for each of possible actions of the target object in the environment, a next state occurring thereafter to obtain a plurality of simulated next states, based on a pessimistic scenario in which all possible unfavorable actions of other objects occur in the next state in simulation. At least two of the possible unfavorable actions in the next state are unable to simultaneously occur in reality. The method further includes identifying, by the processor device, a safety area for the target object in each of the plurality of simulated next states. The method also includes evaluating, by the processor device, each of the possible actions of the target object, based on the safety area for the target object in each of the plurality of simulated next states.

According to another aspect of the present invention, a computer program product is provided for evaluating a next action of a target object in an environment. The computer program product includes a non-transitory computer readable storage medium having program instructions embodied therewith. The program instructions are executable by a computer to cause the computer to perform a method. The method includes simulating, by a processor device for each of possible actions of the target object in the environment, a next state occurring thereafter to obtain a plurality of simulated next states, based on a pessimistic scenario in which all possible unfavorable actions of other objects occur in the next state in simulation. At least two of the possible unfavorable actions in the next state are unable to simultaneously occur in reality. The method further includes identifying, by the processor device, a safety area for the target object in each of the plurality of simulated next states. The method also includes evaluating, by the processor device, each of the possible actions of the target object, based on the safety area for the target object in each of the plurality of simulated next states.

According to yet another aspect of the present invention, a computer processing system is provided for evaluating a next action of a target object in an environment. The computer processing system includes a memory for storing program code. The computer processing system further includes a processor device for running the program code to simulate, for each of possible actions of the target object in the environment, a next state occurring thereafter to obtain a plurality of simulated next states, based on a pessimistic scenario in which all possible unfavorable actions of other objects occur in the next state in simulation. At least two of the possible unfavorable actions in the next state are unable to simultaneously occur in reality. The processor device further runs the program code to identify a safety area for the target object in each of the plurality of simulated next states. The processor device also runs the program code to evaluate each of the possible actions of the target object, based on the safety area for the target object in each of the plurality of simulated next states.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a real-time search with pessimistic survivability trees.

In an embodiment, nodes of the pessimistic survivability trees represent survivable positions at each of multiple time steps.

In an embodiment, an agent chooses an action based on a depth-limited pessimistic survivability tree of time-state-pairs where the agent can survive (or satisfy all of the constraints in decision making) against a powerful adversarial opponent who can take multiple actions and transition into multiple states in each step in a non-deterministic manner.

In an embodiment, each node in a pessimistic survivability tree can be associated with real values, and an action can be chosen based on the real values. Those real values can represent how likely a powerful adversarial opponent will actually be at a particular node in the survivability tree.

Figure 1:
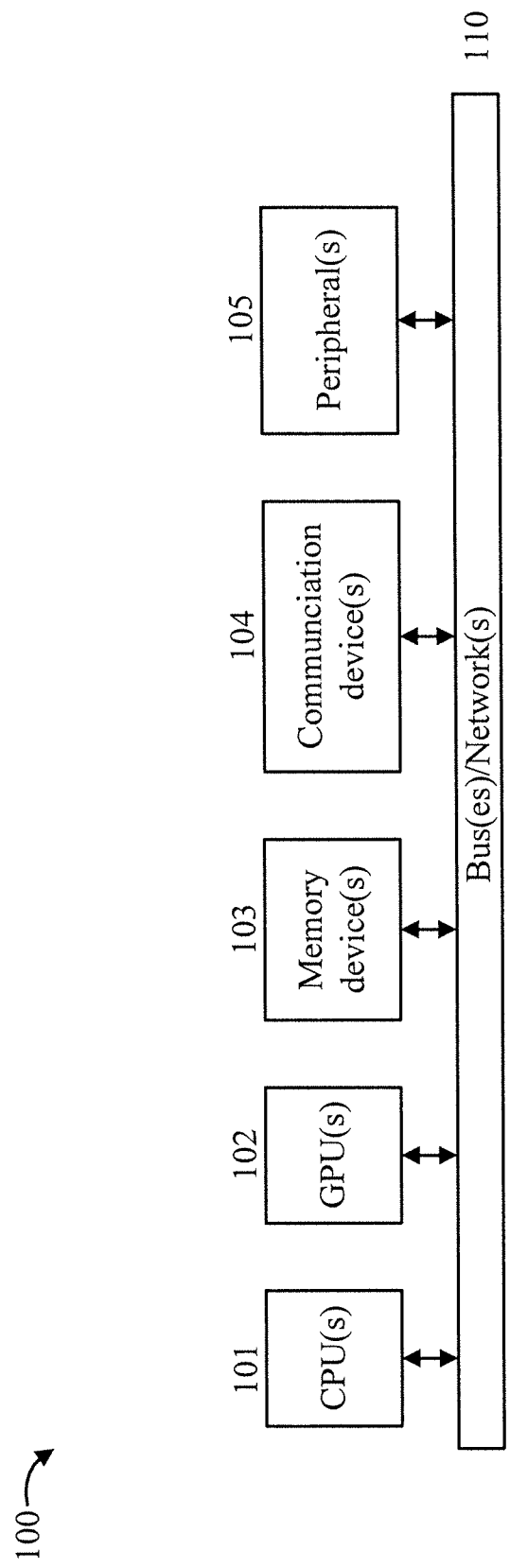
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

In an embodiment, the present invention provides a method of evaluating an action of an object (that is, the target of control) under a pessimistic scenario where stochastic and unfavorable events are realized simultaneously even if they cannot happen simultaneously in reality. Specifically, the pessimistic scenario is generated by simulating the system under consideration, where unfavorable events that can be realized with a positive probability are realized simultaneously and surely at each step of simulation.

The length of the pessimistic scenario to generate can be set in advance to, for example, a length that can be simulated within a time limit required to make decisions in real time.

The number of steps where the unfavorable events are realized may be set shorter than the length of the whole pessimistic scenario in a way that it gives the best end results (i.e., via a standard method of optimizing hyperparameters).

In this way, actions can be evaluated in consideration of how well they can deal with unfavorable events that can happen in the near future. Without the invention, those unfavorable events would have to be ignored, because there are too many cases to consider in real time. These and other advantages of the present invention are readily appreciated by one of ordinary skill in the art, given the teachings of the present invention provided herein.

Figure 2:
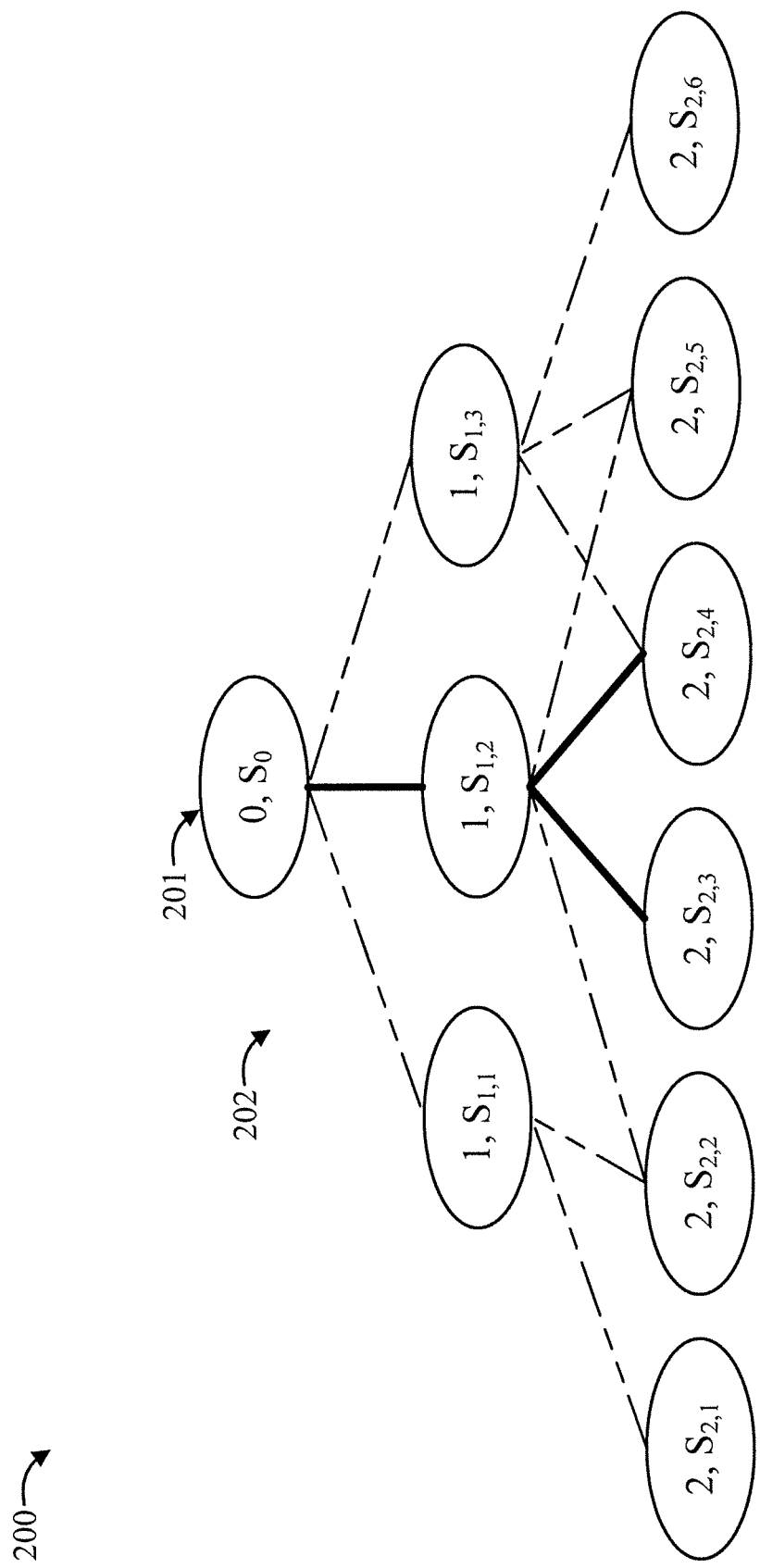
FIG. 2 is a diagram showing a pessimistic survivability tree, in accordance with an embodiment of the present invention.

FIG. 2 is a diagram showing a pessimistic survivability tree 200, in accordance with an embodiment of the present invention. The pessimistic survivability tree 200 includes a root node 201, and leaf nodes 202 at various hierarchical levels (here level L0 through L2, with the root at L0 and the leaves at L1 and L2), where each hierarchical level represents a different time step. Each node of the pessimistic survivability tree includes time-state-pairs. As shown in the nodes, the first character of the time-state pairs is an integer representing a time step (here, 0, 1 or 2) and the following characters represent a current state and a possible next state preceded by the prefix S, with the current state and the possible next state denoted as subscripts with respect to the prefix S. Of course, other conventions can be used, given the teachings of the present invention provided herein. Based on the pessimistic survivability tree, an agent attempts to survive (or satisfy any and all constraints in decision making) against a powerful adversarial opponent who can take multiple actions and transition into multiple states in each time step in a nondeterministic manner.

In an embodiment, each node can be associated with real values, and an action can be chosen based on the real values. The real values can represent how likely the power adversarial opponent will actually be at the node or how likely any and all constraints are satisfied in decision making.

Figure 3:
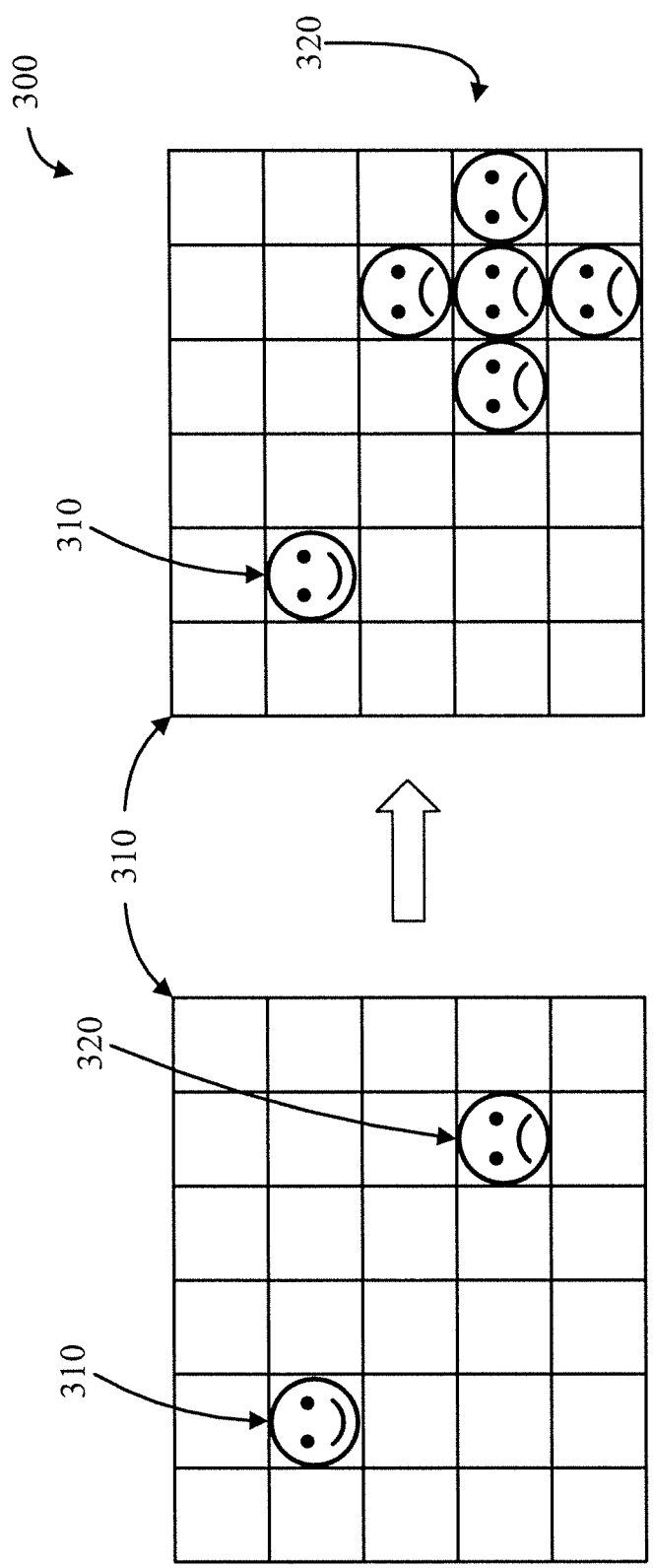
FIG. 3 is a diagram showing the generating of an exemplary pessimistic scenario, in accordance with an embodiment of the present invention.

FIG. 3 is a diagram showing the generating of an exemplary pessimistic scenario 300, in accordance with an embodiment of the present invention.

An input for the pessimistic scenario 300 involves an environment 310 having an object under control (hereinafter interchangeably referred to as the "target object" 311 and represented by a happy (smiling) face) and one or more other objects (e.g., a powerful adversarial opponent(s), a car(s), a pedestrian(s), etc. 312 and represented by a sad (frowning) face), from which the pessimistic scenario 300 as shown on the right side is formed. In the example of FIG. 3, a single powerful adversarial opponent 320 is involved as shown on the left. As shown on the right, the pessimistic scenario 300 involves the powerful adversarial opponent 320 taking multiple actions simultaneously (noting the occupation of multiple different locations simultaneously by the powerful adversarial opponent 320). While the other object (powerful adversarial opponent 320) cannot occupy two spots simultaneously in reality, for the purpose of simulation in accordance with the present invention, all unfavorable actions (e.g., spot occupations) occur in the simulation.

Figure 4:
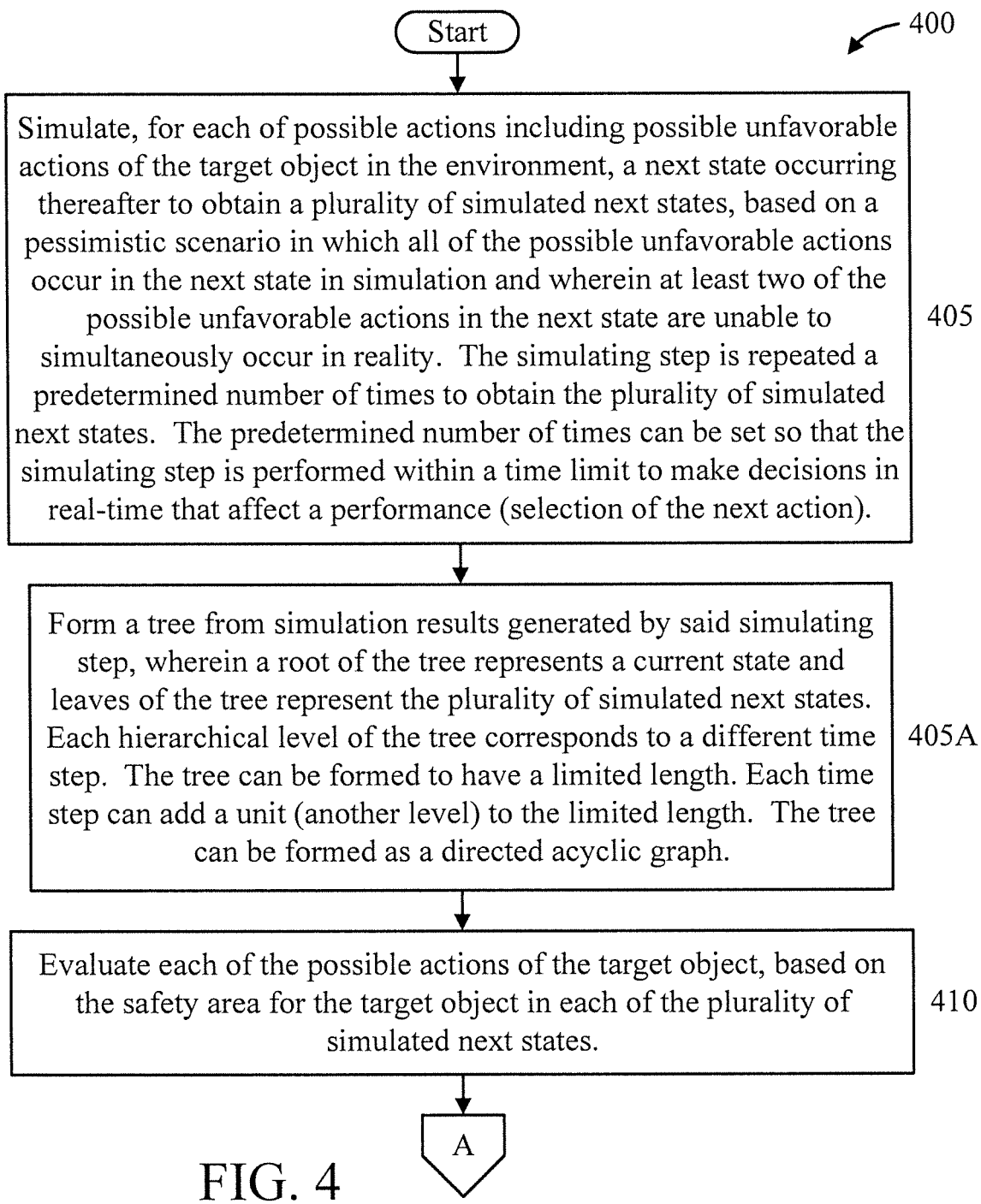
FIGS. 4-5 are flow diagrams showing an exemplary method for performing a real-time search with pessimistic survivability trees to evaluate a next action to be taken by a target object in an environment, in accordance with an embodiment of the present invention.
Figure 5:
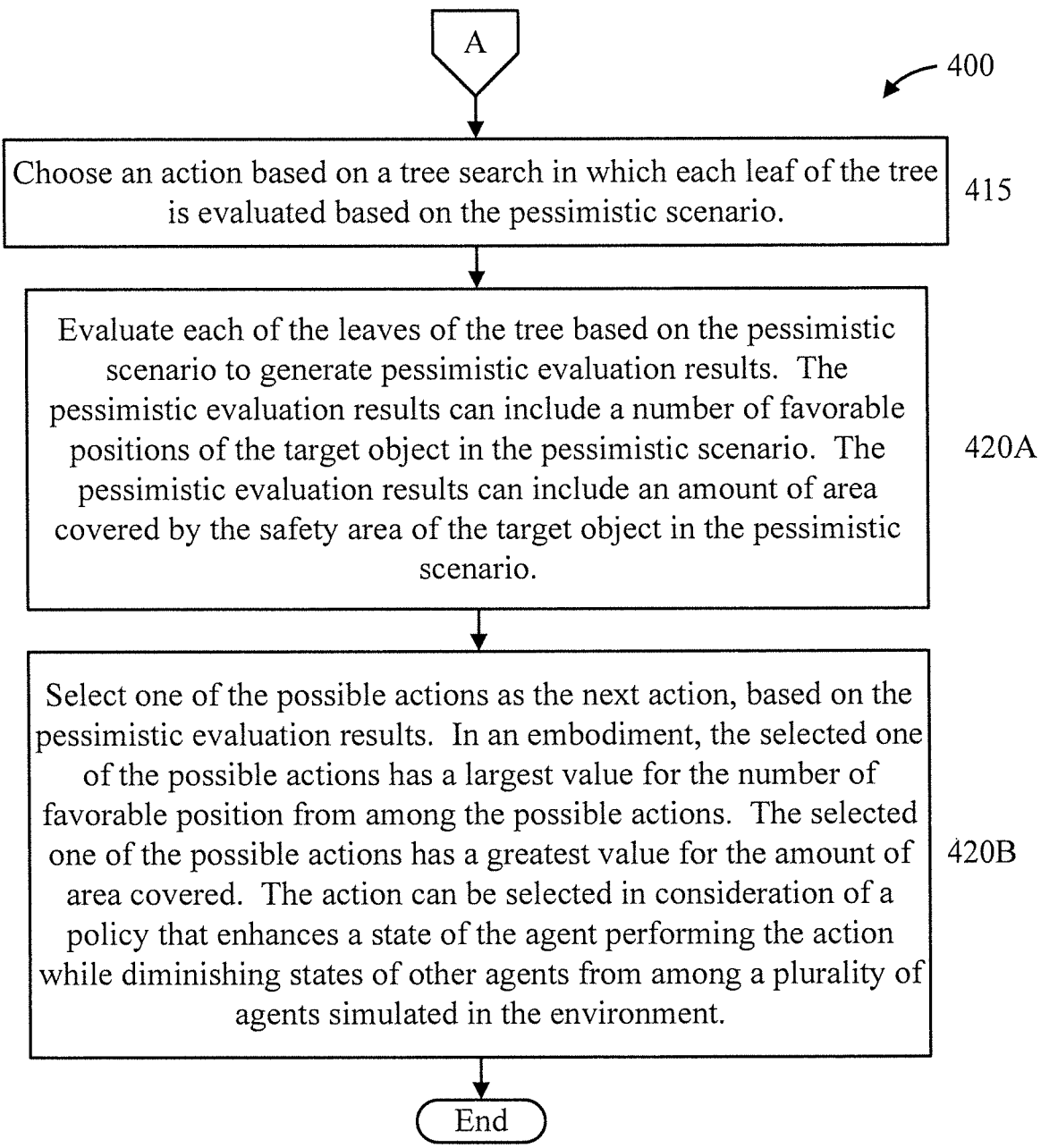

FIGS. 4-5 are flow diagrams showing an exemplary method 400 for performing a real-time search with pessimistic survivability trees to evaluate a next action to be taken by a target object in an environment, in accordance with an embodiment of the present invention.

At block 405, simulate, for each of possible actions including possible unfavorable actions of the target object in the environment, a next state occurring thereafter to obtain a plurality of simulated next states, based on a pessimistic scenario in which all of the possible unfavorable actions occur in the next state in simulation and wherein at least two of the possible unfavorable actions in the next state are unable to simultaneously occur in reality. In an embodiment, the simulating step is repeated a predetermined number of times to obtain the plurality of simulated next states. In an embodiment, the predetermined number of times can be set so that the simulating step is performed within a time limit to make decisions in real-time that affect a performance (selection of the next action).

In an embodiment, block 405 can include block 405A.

At block 405A, form a tree from simulation results generated by said simulating step, wherein a root of the tree represents a current state and leaves of the tree represent the plurality of simulated next states. In an embodiment, each hierarchical level of the tree corresponds to a different time step. In an embodiment, the tree can be formed to have a limited length. In an embodiment, each time step can add a unit (another level) to the limited length. In an embodiment, the tree can be formed as a directed acyclic graph.

At block 410, identify a safety area for the target object in each of the plurality of simulated next states.

At block 415, evaluate each of the possible actions of the target object, based on the safety area for the target object in each of the plurality of simulated next states.

At block 420, choose an action based on a tree search in which each leaf of the tree is evaluated based on the pessimistic scenario.

In an embodiment, block 420 can include one or more of blocks 420A and 420B.

At block 420A, evaluate each of the leaves of the tree based on the pessimistic scenario to generate pessimistic evaluation results. In an embodiment, the pessimistic evaluation results can include a number of favorable positions of the target object in the pessimistic scenario. In an embodiment, the pessimistic evaluation results can include an amount of area covered by the safety area of the target object in the pessimistic scenario.

At block 420B, select one of the possible actions as the next action, based on the pessimistic evaluation results. In an embodiment, the selected one of the possible actions has a largest value for the number of favorable position from among the possible actions. In an embodiment, the selected one of the possible actions has a greatest value for the amount of area covered. In an embodiment, the action can be selected in consideration of a policy that enhances a state of the agent performing the action while diminishing states of other agents from among a plurality of agents simulated in the environment.

Figure 6:
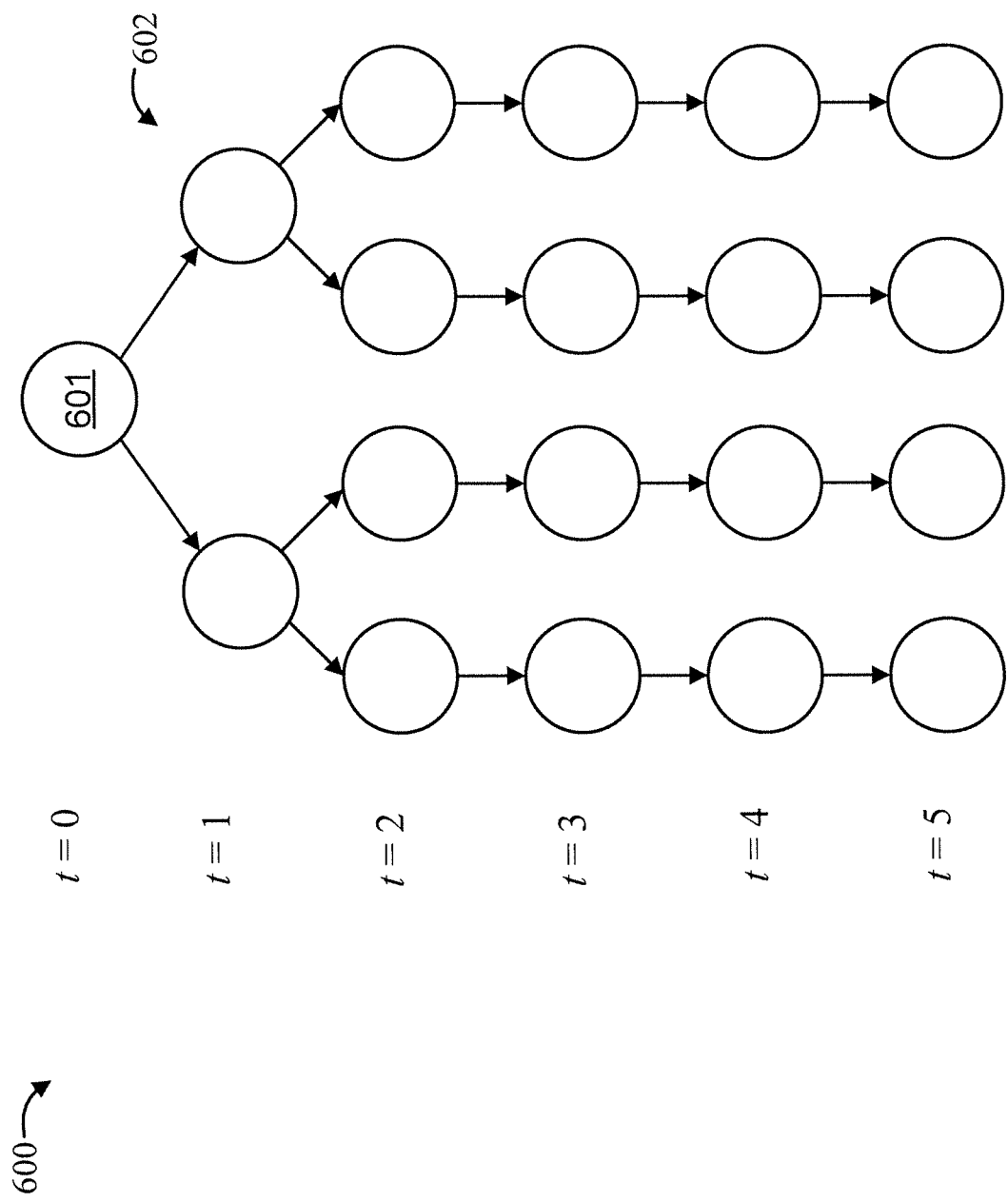
FIG. 6 is a block diagram showing an exemplary tree to which the present invention can be applied, in accordance with an embodiment of the present invention.

Further regarding the tree of block 405, FIG. 6 is a block diagram showing an exemplary tree 600 to which the present invention can be applied, in accordance with an embodiment of the present invention.

The root 601 of the tree corresponds to a current state, and the leaves 602 of the tree corresponding to possible next states. In an embodiment, each hierarchical level of the tree corresponding to a different time step/point (e.g., t=0 through t=5, with the root corresponding to time t=0).

Further regarding block 420, a team safety score $S_{team}$ and enemies safety score $S_{enemy}$ can be computed as follows:

$$S_{team}(a_1, a_2) = [\min_{a_3, a_4} S_1(a_1, a_2, a_3, a_4)] \times [\min_{a_3, a_4} S_2(a_1, a_2, a_3, a_4)]$$

$$S_{average}(a_1, a_2) =$$
$$[\underset{a_3, a_4}{\text{average }} S_3(a_1, a_2, a_3, a_4)] \times [\underset{a_3, a_4}{\text{average }} S_4(a_1, a_2, a_3, a_4)]$$

Here, the following definitions apply:
$a_1$ denotes a first action of my agent,
$a_2$ denotes a first action of a teammate,
$a_3$, $a_4$ denote first actions of enemy1 and enemy2, respectively, and
$S_*(a_1, a_2, a_3, a_4)$ denotes a "Safety Score" of agent * when the first action set is $(a_1, a_2, a_3, a_4)$.

Here, the best action can be found using the following minimization:

$$(\hat{a}_1, \hat{a}_2) = \min_{a_1, a_2} \frac{S_{enemy}(a_1, a_2)}{S_{team}(a_1, a_2)}$$

Figure 7:
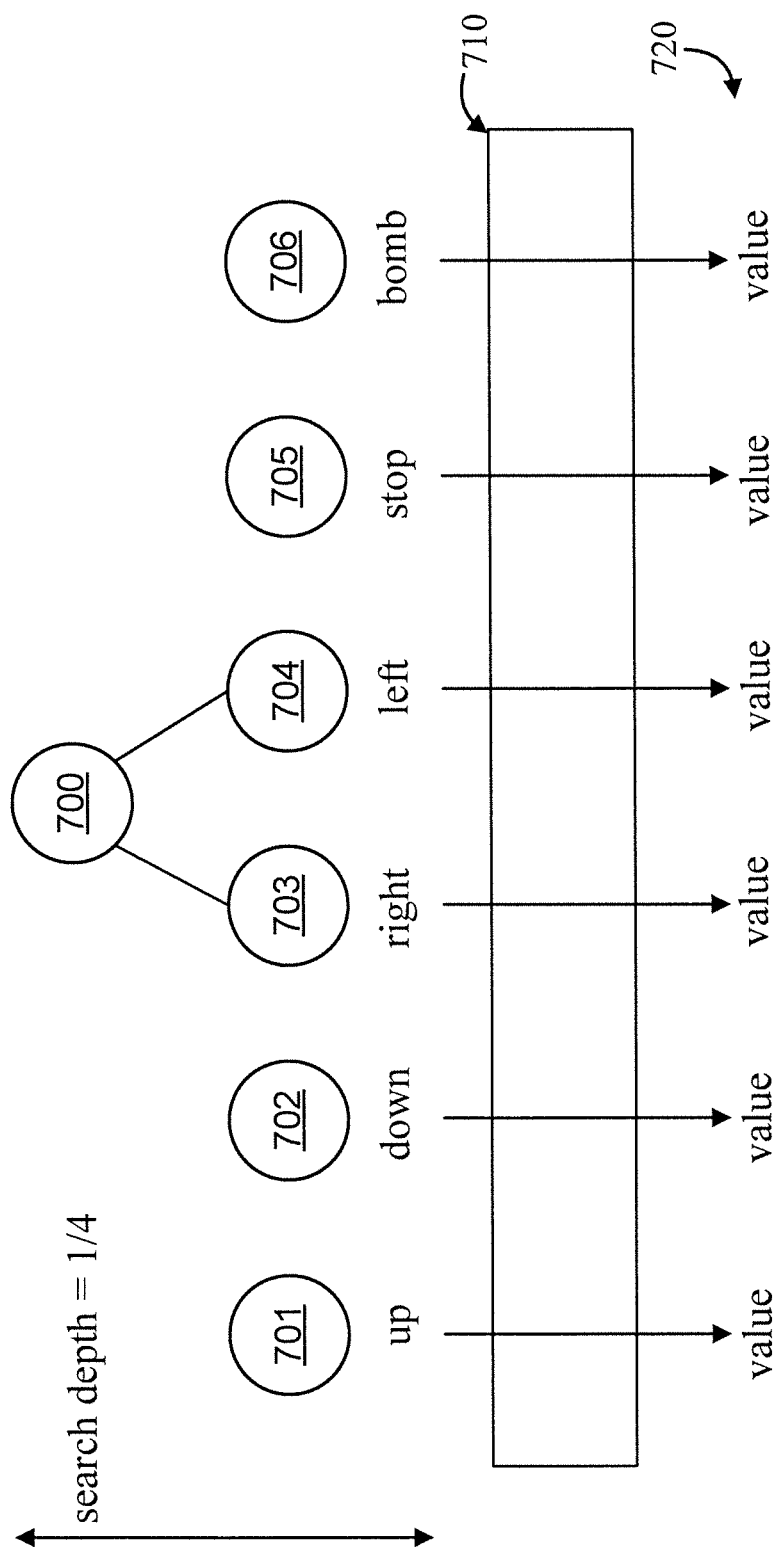
FIG. 7 is a block diagram showing six exemplary actions with an action-value function, in accordance with an embodiment of the present invention.

FIG. 7 is a block diagram showing six exemplary actions 701 through 706 with an action-value function 710, in accordance with an embodiment of the present invention. The action-value function 710 looks ten steps ahead to provide corresponding output action-values 720. The root node is denoted by the figure reference numeral 700. In the embodiment of FIG. 7, the search depth is ¼, although other depths can be used. The 6 actions include up, down, right, left, stop, and bomb, although other actions can be used. The corresponding output action-values 720 includes action-value 1 through action-value 6. In an embodiment, the action-values can be based on the number of nodes in pessimistic survivability DAGs.

FIG. 8-12 are block diagrams showing exemplary environment states 800 to which the present invention can be applied, in accordance with an embodiment of the present invention.

Figure 8:
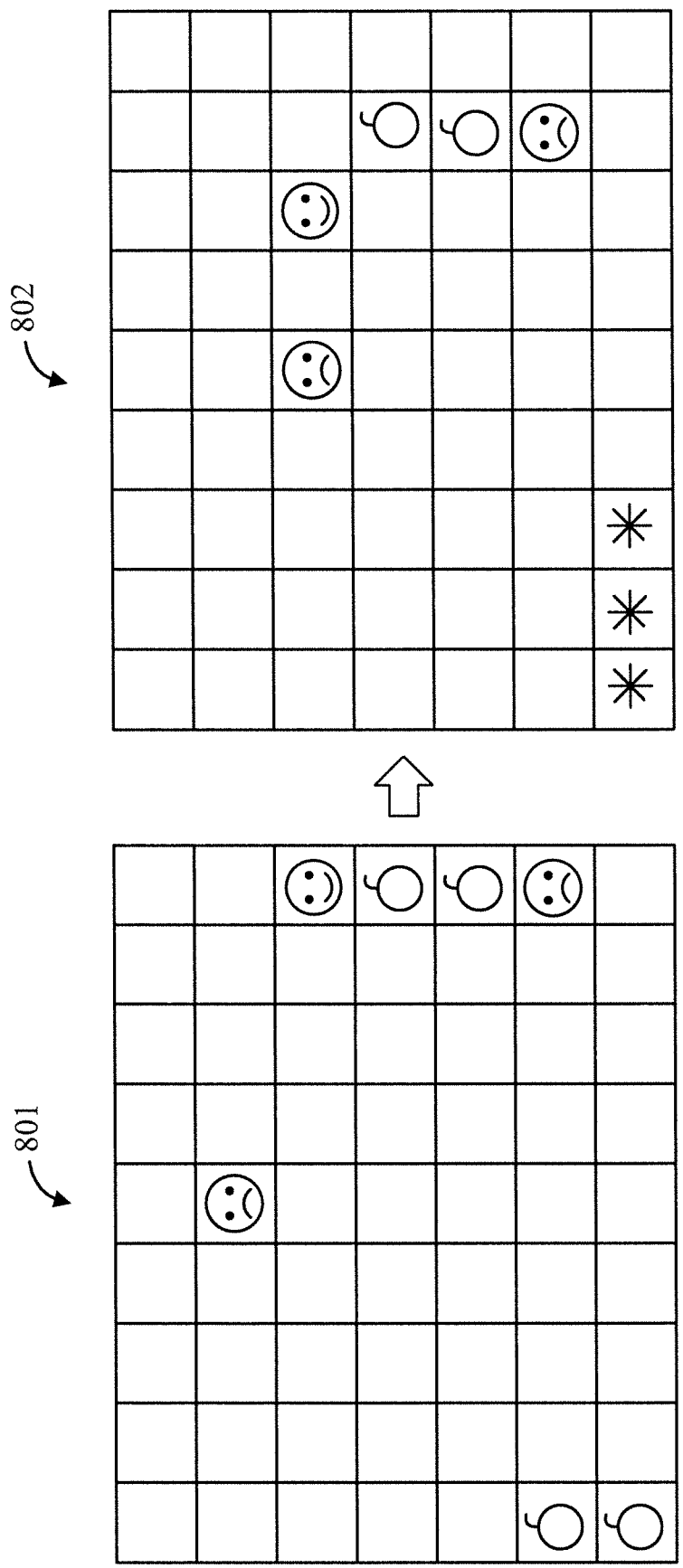
FIG. 8-12 are block diagrams showing exemplary environment states to which the present invention can be applied, in accordance with an embodiment of the present invention.
Figure 9:
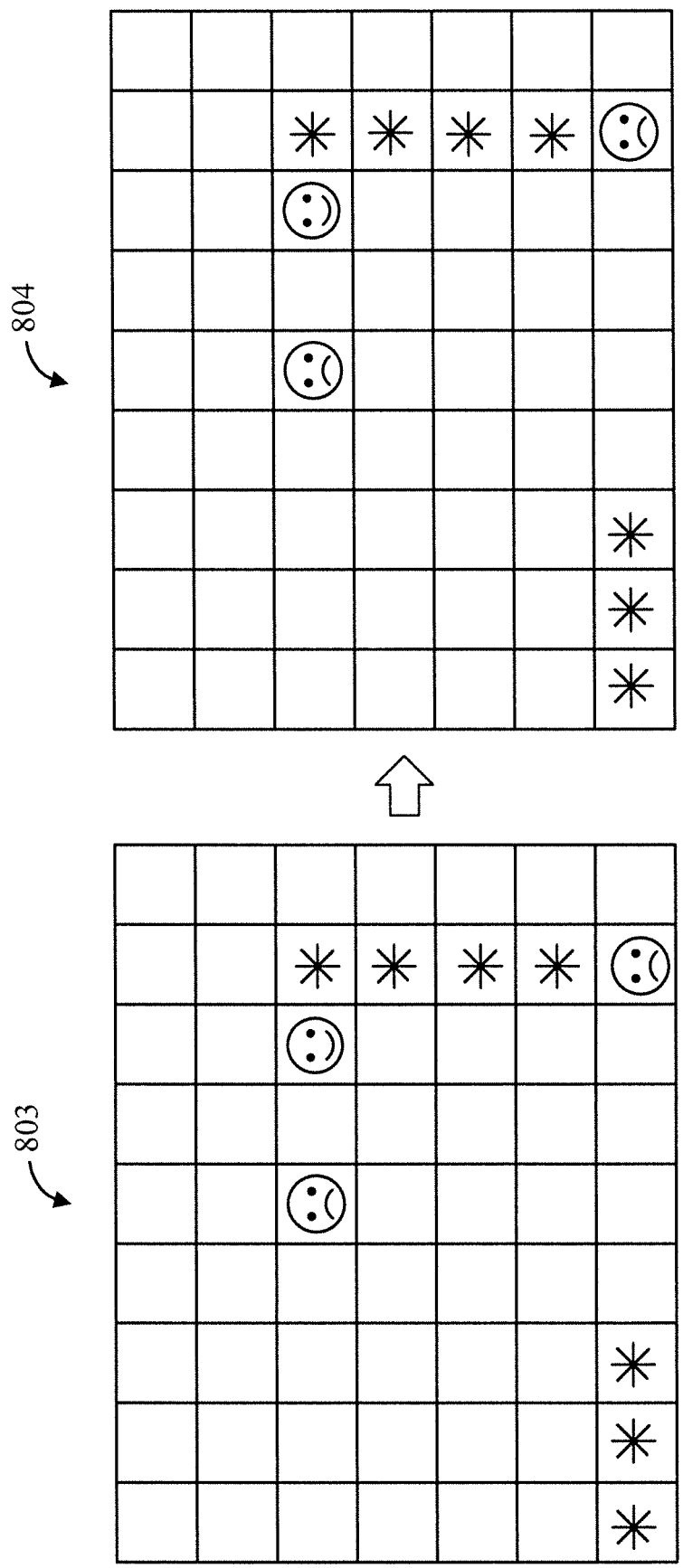
Figure 10:
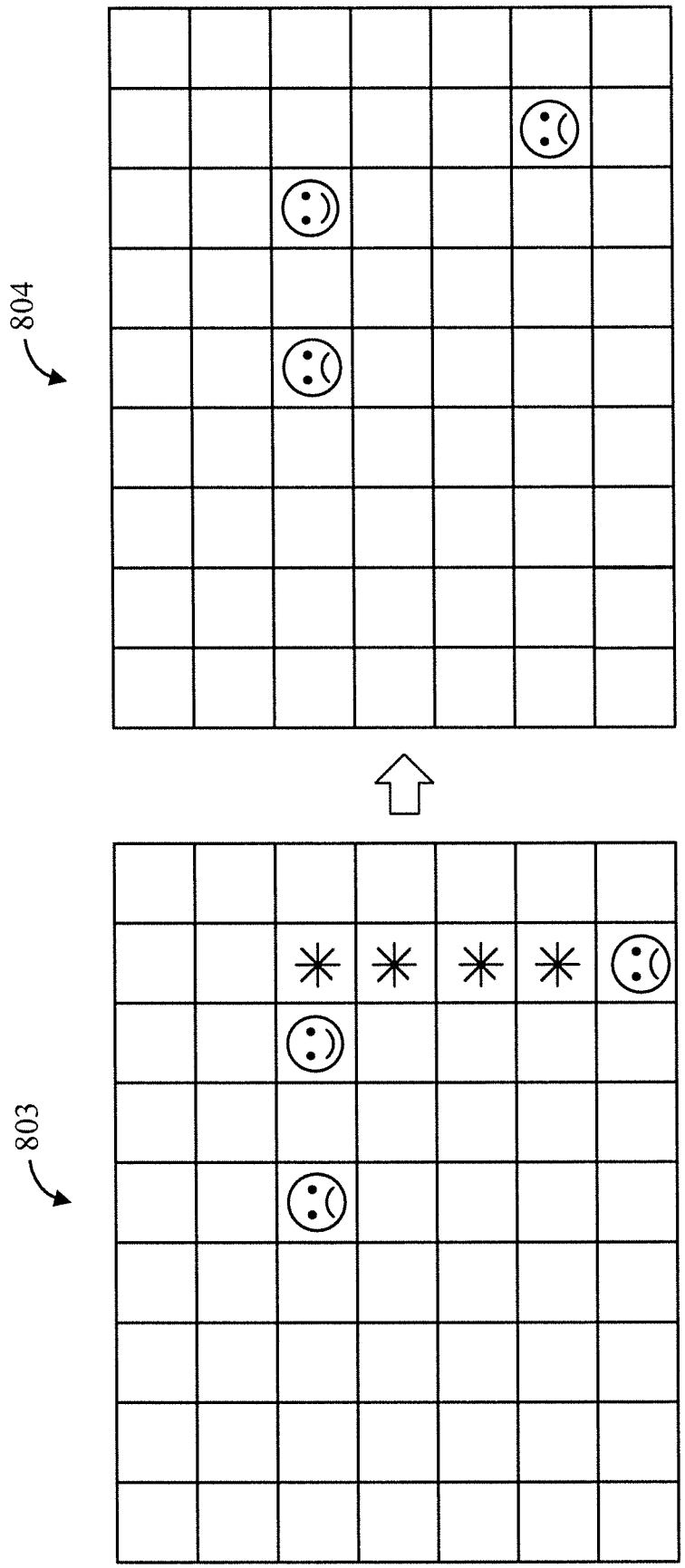
Figure 11:
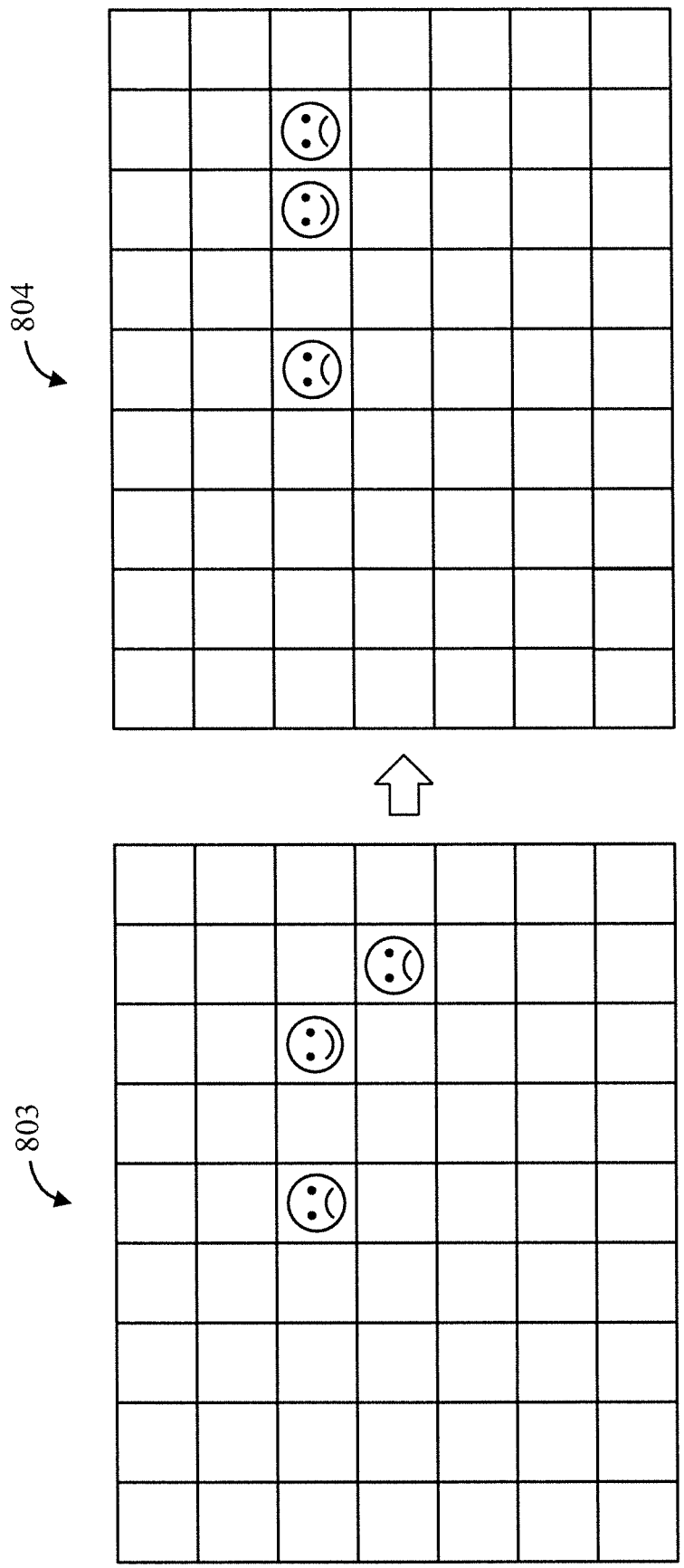
Figure 12:
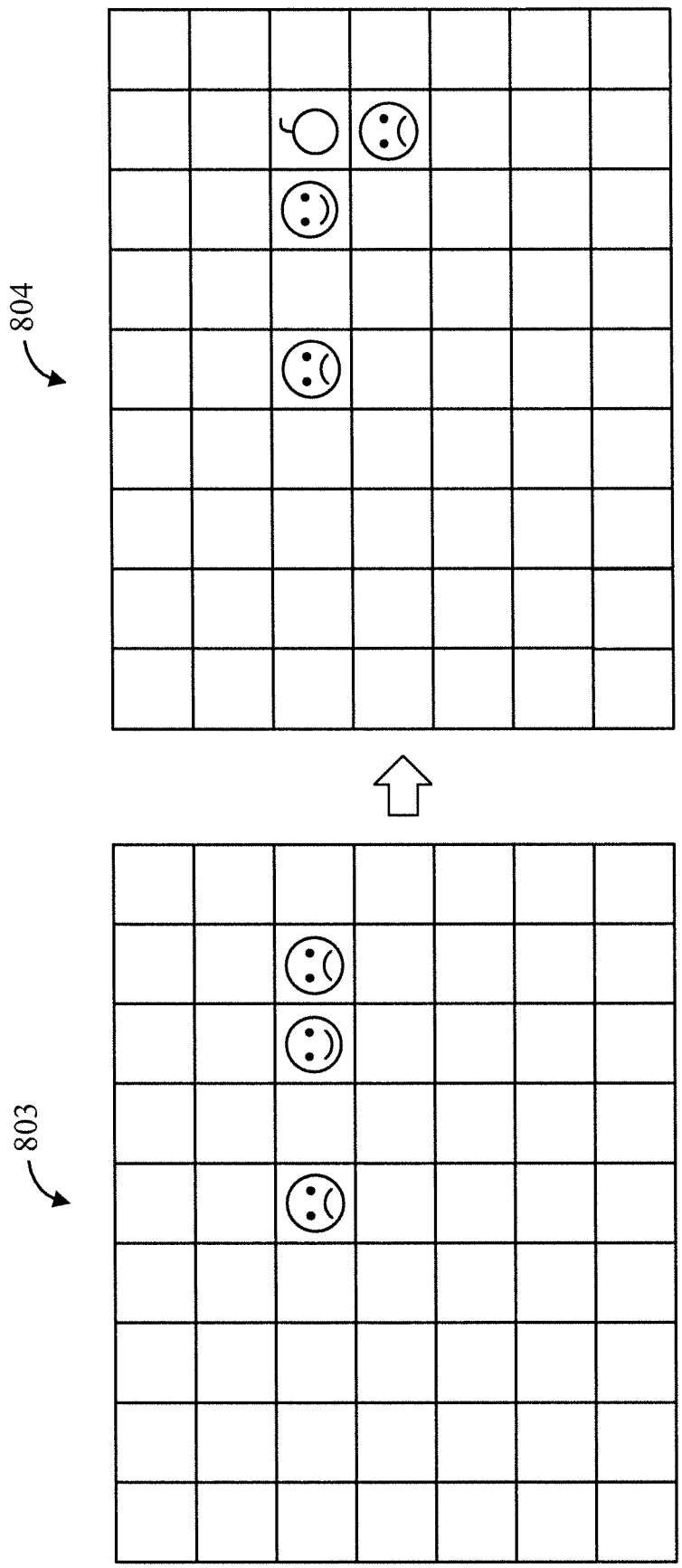

In particular, FIG. 8 shows a first state 801 and a second state 802, FIG. 9 shows a third state 803 and a fourth state 804, FIG. 10 shows a fifth state 805 and a sixth state 806, FIG. 11 shows a seventh state 807 and an eighth state 808, and FIG. 12 shows a ninth state 809 and a tenth state 810, in accordance with an embodiment of the present invention.

Figure 13:
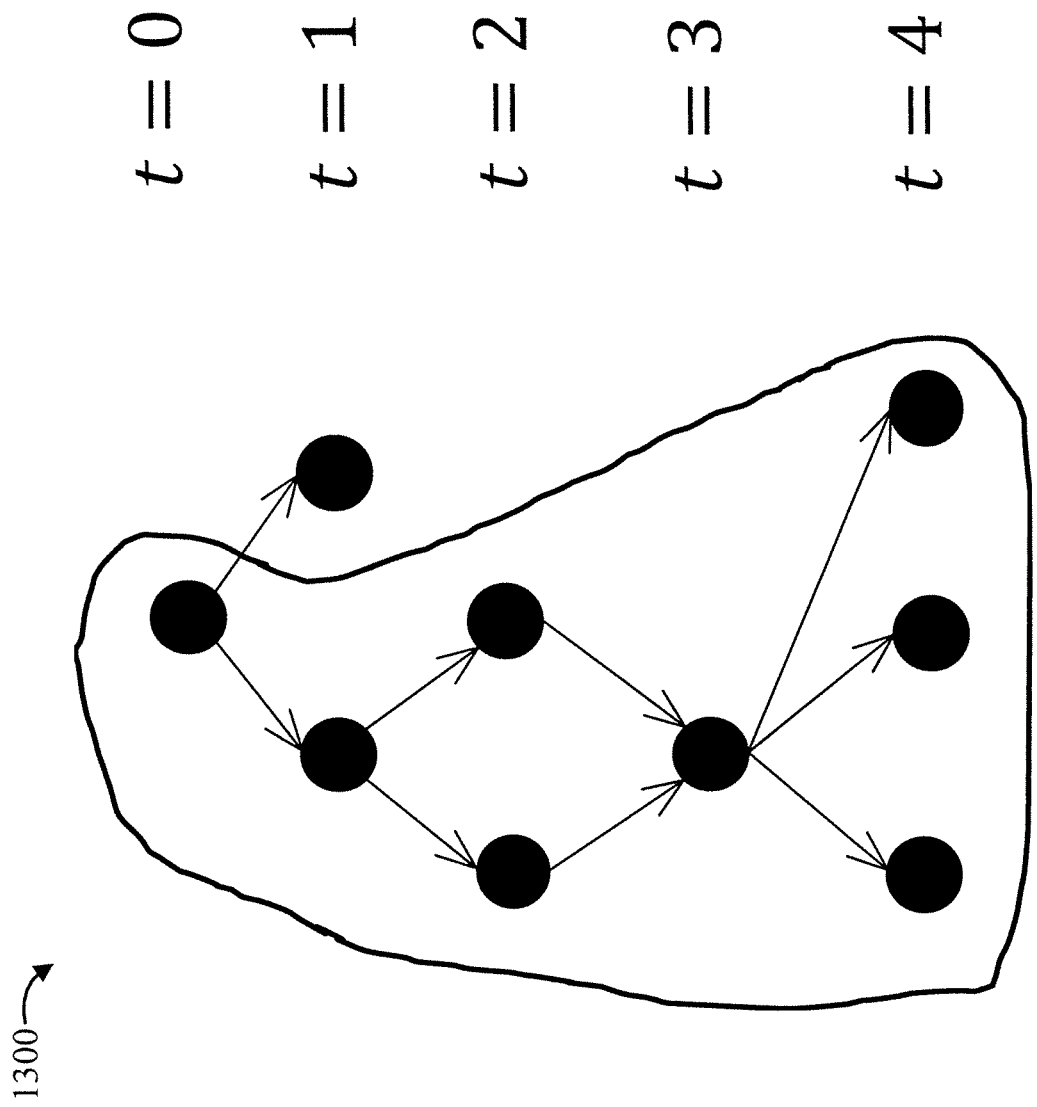
FIG. 13 is a block diagram showing a survivability DAG corresponding to the first 5 steps of a ten step look ahead, in accordance with an embodiment of the present invention.

FIG. 13 is a block diagram showing a survivability DAG 13 corresponding to the first 5 steps of a ten step look ahead, in accordance with an embodiment of the present invention. The survivability DAGs include survivable positions at each time step/point. In the example of FIG. 9, the survivability of the target object=size of the survivability DAG FIG. 14 is a block diagram showing the generation 1400 of a next step state for all combinations of actions from the current state, in accordance with an embodiment of the present invention.

The current state is shown in block 1401.
In block 1402, the following applies:
Me: right; and
Enemy: stop
In block 1403, the following applies:
Me: left; and
Enemy: down
In block 1404, the following applies:
Me: down; and
Enemy: right.

Figure 14:
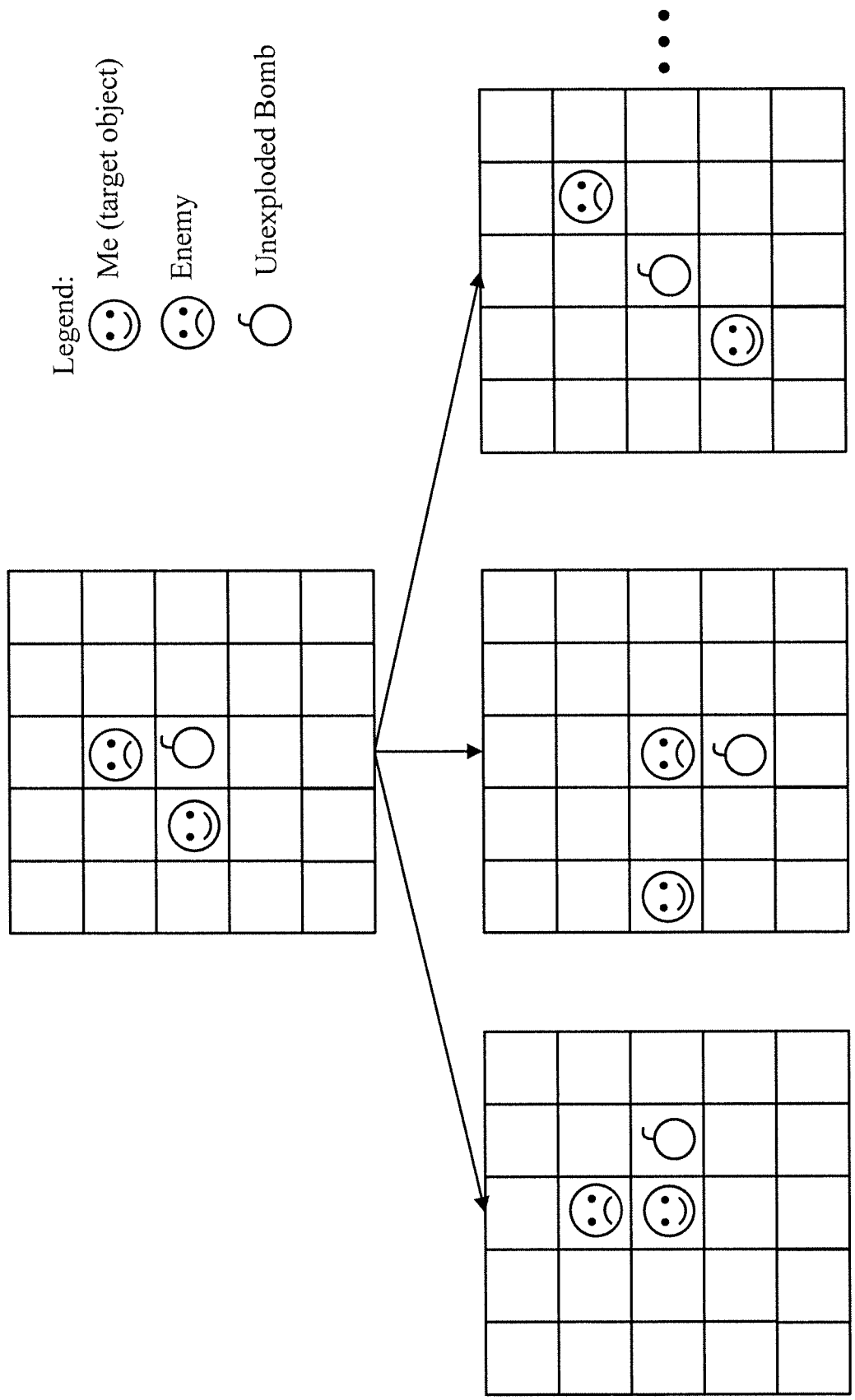
FIG. 14 is a block diagram showing the generation of a next step state for all combinations of actions from the current state, in accordance with an embodiment of the present invention.
Figure 15:
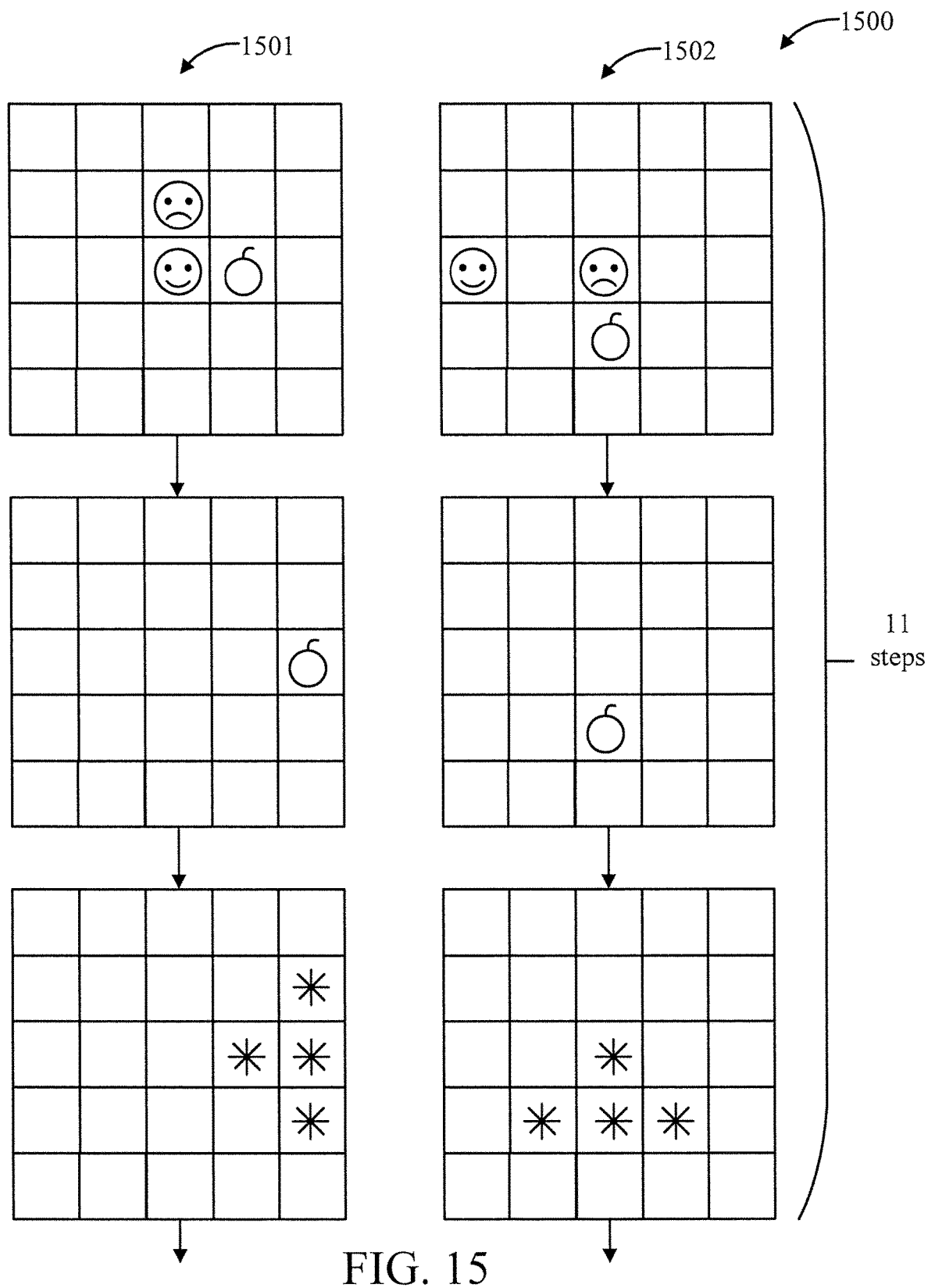
FIGS. 15-16 are block diagrams showing a computation of a board sequence for each next step state of FIG. 14, in accordance with an embodiment of the present invention.
Figure 16:
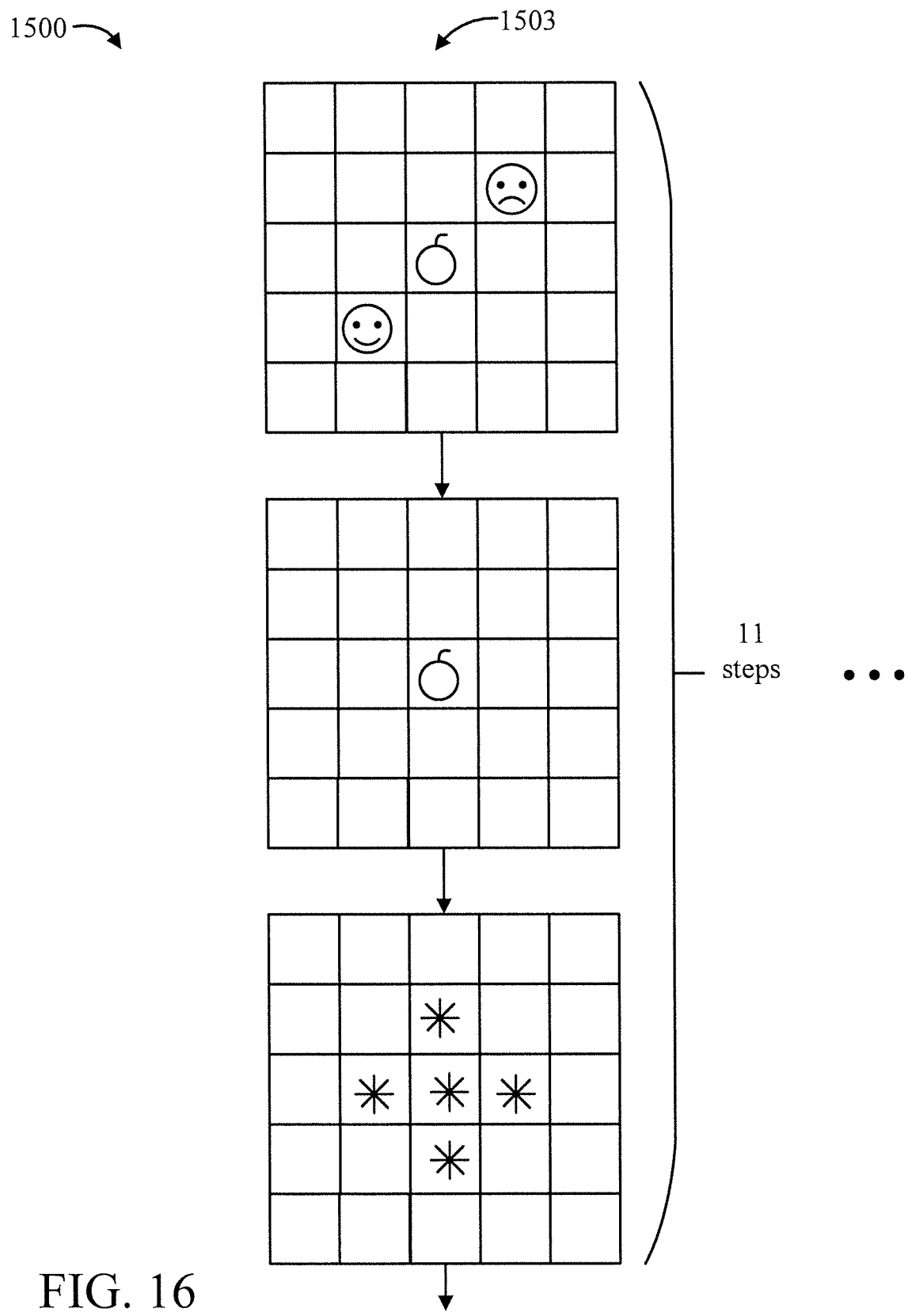

FIGS. 15-16 are block diagrams showing a computation 1500 of a board sequence for each next step state of FIG. 14, in accordance with an embodiment of the present invention.

In the example of FIGS. 15-16, three board sequences are shown, namely board sequences 1501, 1502, and 1503.

Figure 17:
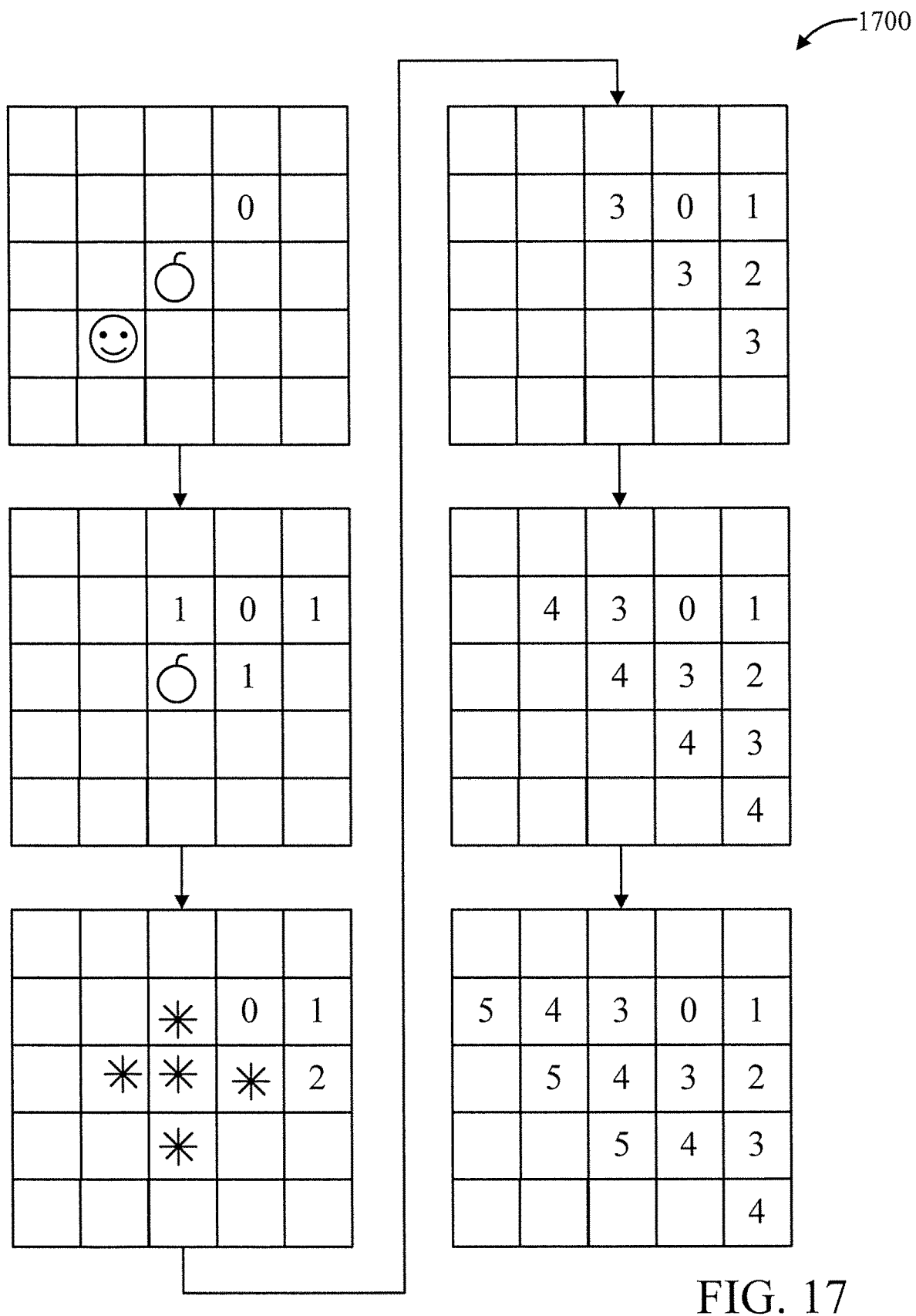
FIG. 17 is a block diagram showing a computation of a minimum arriving time, in accordance with an embodiment of the present invention.

FIG. 17 is a block diagram showing a computation 1700 of a minimum arriving time, in accordance with an embodiment of the present invention. As used herein, the phrase "minimum arriving time" of an agent to a position refers to the earliest time when that agent can arrive at that position.

Figure 18:
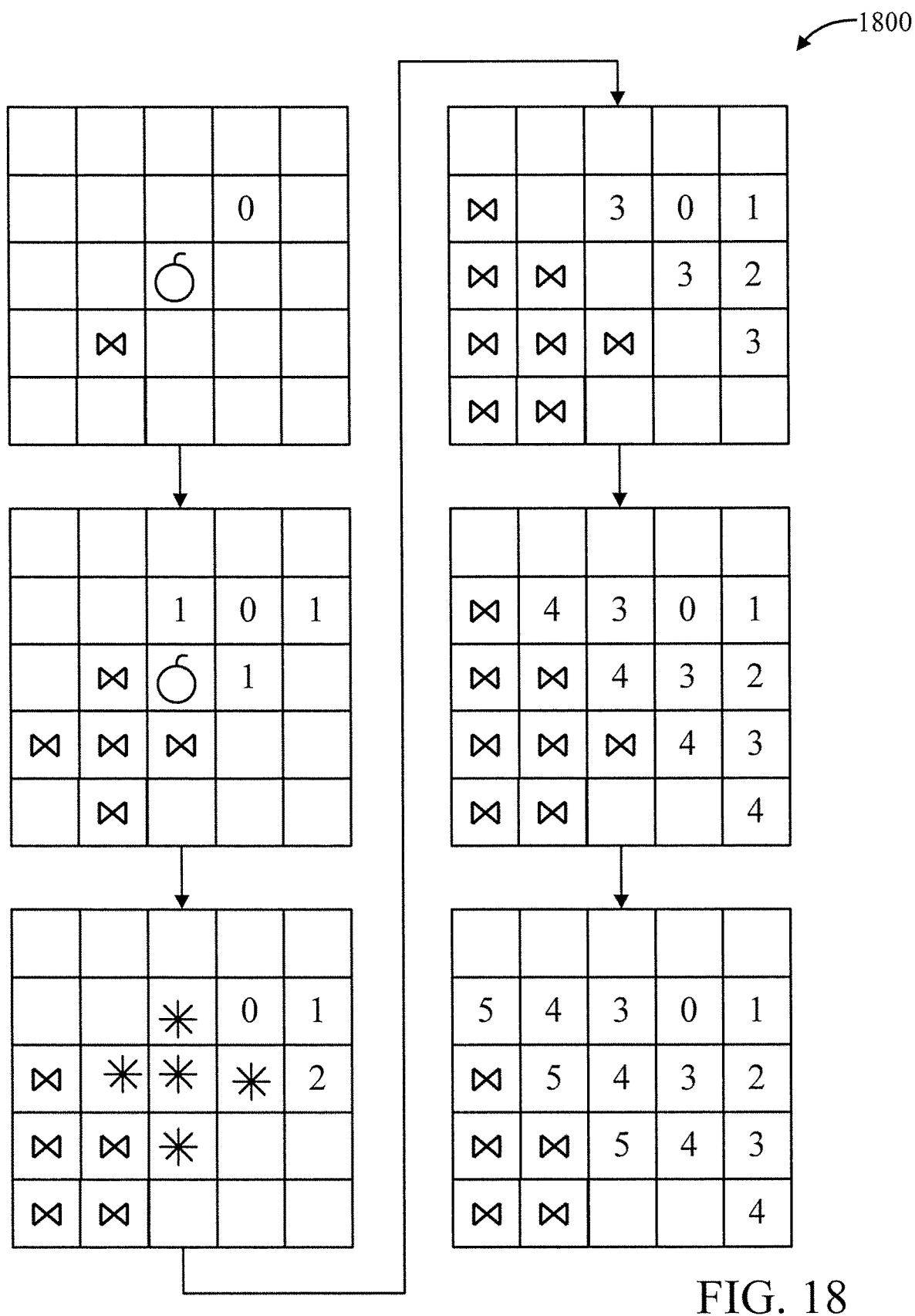
FIG. 18 is a block diagram showing a computation of a maximum contact time, in accordance with an embodiment of the present invention.

FIG. 18 is a block diagram showing a computation 1800 of a maximum contact time, in accordance with an embodiment of the present invention. As used herein, the phrase "maximum contact time" refers to a maximum time when my agent contacts enemies considering all paths toward a cell.

Figure 19:
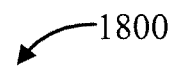
FIG. 19 is a diagram showing a computation of a safety score, in accordance with an embodiment of the present invention.

FIG. 19 is a diagram showing a computation 1900 of a safety score, in accordance with an embodiment of the present invention.

Computation of the safety score involves computing a histogram of the maximum contact time. In further detail, the computation of FIG. 18 finds that the maximum contact time is greater than 5 in 5 positions, 5 in 3 positions, 4 in 4 positions, 3 in 3 positions, and so on. The safety score can then be computed as $$\sum_b r^b \; freq(b)$$

where the summation is over all possible maximum contact time, freq(b) denotes the number of positions where the maximum contact time is b, r is a parameter such as r=10. For positions whose maximum contact time is greater than 5, one can set b=6 in the preceding equation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for evaluating a next action of a target object in an environment, comprising:
    simulating, by a processor device for each of possible actions of the target object in the environment, a next state occurring thereafter to obtain a plurality of simulated next states, based on a pessimistic scenario in which all possible unfavorable actions of other objects occur in the next state in simulation, and wherein at least two of the possible unfavorable actions in the next state are unable to simultaneously occur in reality;
    identifying, by the processor device, a safety area for the target object in each of the plurality of simulated next states; and
    evaluating, by the processor device, each of the possible actions of the target object, based on the safety area for the target object in each of the plurality of simulated next states.

2. The computer-implemented method of claim 1, wherein said simulating step is repeated a predetermined number of times to obtain the plurality of simulated next states.

3. The computer-implemented method of claim 2, wherein the predetermined number of times is set so that the simulating step is performed within a time limit to make decisions in real-time that affect a performance of the next action.

4. The computer-implemented method of claim 1, further comprising forming a tree from simulation results generated by said simulating step, wherein a root of the tree represents a current state and leaves of the tree represent the plurality of simulated next states.

5. The computer-implemented method of claim 4, wherein the tree is formed to have a limited length.

6. The computer-implemented method of claim 4, wherein the tree is formed as a directed acyclic graph.

7. The computer-implemented method of claim 4, further comprising:
    evaluating each of the leaves of the tree based on the pessimistic scenario to generate pessimistic evaluation results; and
    selecting one of the possible actions as the next action, based on the pessimistic evaluation results.

8. The computer-implemented method of claim 7, wherein the pessimistic evaluation results comprise a number of favorable positions of the target object in the pessimistic scenario, and wherein the selected one of the possible actions has a largest value for the number of favorable position from among the possible actions.

9. The computer-implemented method of claim 7, wherein the pessimistic evaluation results comprise an amount of area covered by the safety area of the target object in the pessimistic scenario, wherein the selected one of the possible actions has a greatest value for the amount of area covered.

10. The computer-implemented method of claim 7, wherein the action is selected in consideration of a policy that enhances a state of the agent performing the action while diminishing states of other agents from among a plurality of agents simulated in the environment.

11. A computer program product for evaluating a next action of a target object in an environment, the computer program product comprising a non-transitory computer readable storage medium having program instructions embodied therewith, the program instructions executable by a computer to cause the computer to perform a method comprising:
 simulating, by a processor device for each of possible actions of the target object in the environment, a next state occurring thereafter to obtain a plurality of simulated next states, based on a pessimistic scenario in which all possible unfavorable actions occur of other objects in the next state in simulation, and wherein at least two of the possible unfavorable actions in the next state are unable to simultaneously occur in reality;
 identifying, by the processor device, a safety area for the target object in each of the plurality of simulated next states; and
 evaluating, by the processor device, each of the possible actions of the target object, based on the safety area for the target object in each of the plurality of simulated next states.

12. The computer program product of claim 11, wherein said simulating step is repeated a predetermined number of times to obtain the plurality of simulated next states.

13. The computer program product of claim 12, wherein the predetermined number of times is set so that the simulating step is performed within a time limit to make decisions in real-time that affect a performance of the next action.

14. The computer program product of claim 11, further comprising forming a tree from simulation results generated by said simulating step, wherein a root of the tree represents a current state and leaves of the tree represent the plurality of simulated next states.

15. The computer program product of claim 14, wherein the tree is formed to have a limited length.

16. The computer program product of claim 14, wherein the tree is formed as a directed acyclic graph.

17. The computer program product of claim 14, further comprising:
 evaluating each of the leaves of the tree based on the pessimistic scenario to generate pessimistic evaluation results; and
 selecting one of the possible actions as the next action, based on the pessimistic evaluation results.

18. The computer program product of claim 17, wherein the pessimistic evaluation results comprise a number of favorable positions of the target object in the pessimistic scenario, and wherein the selected one of the possible actions has a largest value for the number of favorable position from among the possible actions.

19. The computer program product of claim 17, wherein the pessimistic evaluation results comprise an amount of area covered by the safety area of the target object in the pessimistic scenario, wherein the selected one of the possible actions has a greatest value for the amount of area covered.

20. A computer processing system for evaluating a next action of a target object in an environment, comprising:
 a memory for storing program code; and
 a processor device for running the program code to
 simulate, for each of possible actions of the target object in the environment, a next state occurring thereafter to obtain a plurality of simulated next states, based on a pessimistic scenario in which all possible unfavorable actions of other objects occur in the next state in simulation, and wherein at least two of the possible unfavorable actions in the next state are unable to simultaneously occur in reality;
 identify a safety area for the target object in each of the plurality of simulated next states; and
 evaluate each of the possible actions of the target object, based on the safety area for the target object in each of the plurality of simulated next states.

* * * * *